(12) United States Patent
Walczak et al.

(10) Patent No.: US 11,321,580 B1
(45) Date of Patent: May 3, 2022

(54) ITEM TYPE DISCOVERY AND CLASSIFICATION USING MACHINE LEARNING

(71) Applicant: Amazon Technologies, Inc., Seattle, CA (US)

(72) Inventors: Krzysztof Marcin Walczak, Seattle, WA (US); Emilio Ian Maldonado, Bothell, WA (US); Bella Dubrov, Duvall, WA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 16/673,769

(22) Filed: Nov. 4, 2019

(51) Int. Cl.
| | | |
|---|---|---|
| G06K 9/62 | (2006.01) |
| G06F 16/957 | (2019.01) |
| G06F 40/284 | (2020.01) |
| G06N 3/08 | (2006.01) |
| G06N 3/04 | (2006.01) |

(52) U.S. Cl.
CPC ......... *G06K 9/6219* (2013.01); *G06F 16/957* (2019.01); *G06F 40/284* (2020.01); *G06K 9/6257* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 2018/0089543 A1* | 3/2018 | Merler | G06K 9/4628 |
| 2018/0336190 A1* | 11/2018 | Ishida | G06F 40/47 |
| 2021/0125058 A1* | 4/2021 | Chowdhury | G06N 3/088 |

OTHER PUBLICATIONS

Fan Yang, "Visual Search at eBay", Aug. 13, 2017, KDD '17: Proceedings of the 23rd ACM SIGKDD International Conference on Knowledge Discovery and Data Mining, pp. 2202-2107.*
Amir Albadvi, "A hybrid recommendation technique based on product category attributes" Nov. 2009, Expert Systems with Applications 36(2019), Issue 9, p. 11480-11487.*

* cited by examiner

*Primary Examiner* — Omar S Ismail
(74) *Attorney, Agent, or Firm* — Knobbe, Martens, Olson & Bear, LLP

(57) ABSTRACT

Systems and methods are provided for learning item types of items listed in an electronic repository, and for training a machine learning model to predict the item type of a given input item. For example, a machine learning model may be obtained or accessed that has been previously trained to classify an input item to a browse node. Vector representations of individual items assigned to different browse nodes may be obtained from an intermediate layer of the previously trained machine learning model, and a vector representation of individual browse nodes may then be generated based on the vector representations of individual items assigned to that browse node. A clustering algorithm may be applied to the browse node vector representations in order to identify clusters of similar browse nodes, where individual clusters may represent different unique item types.

20 Claims, 6 Drawing Sheets

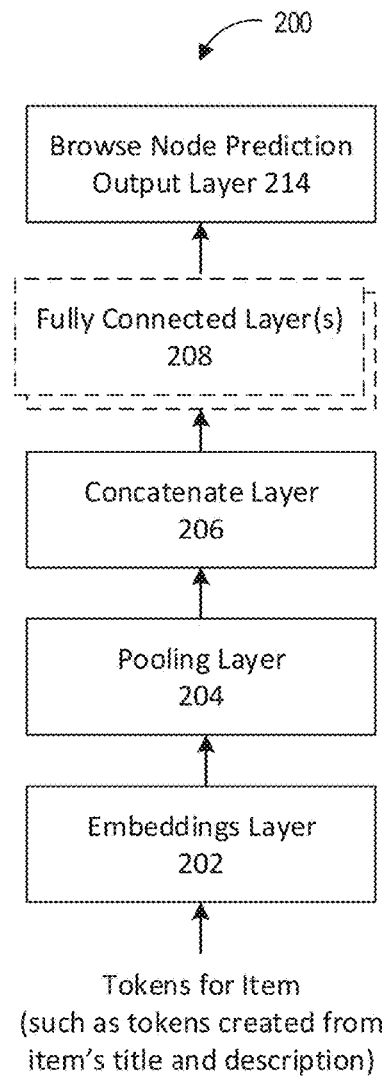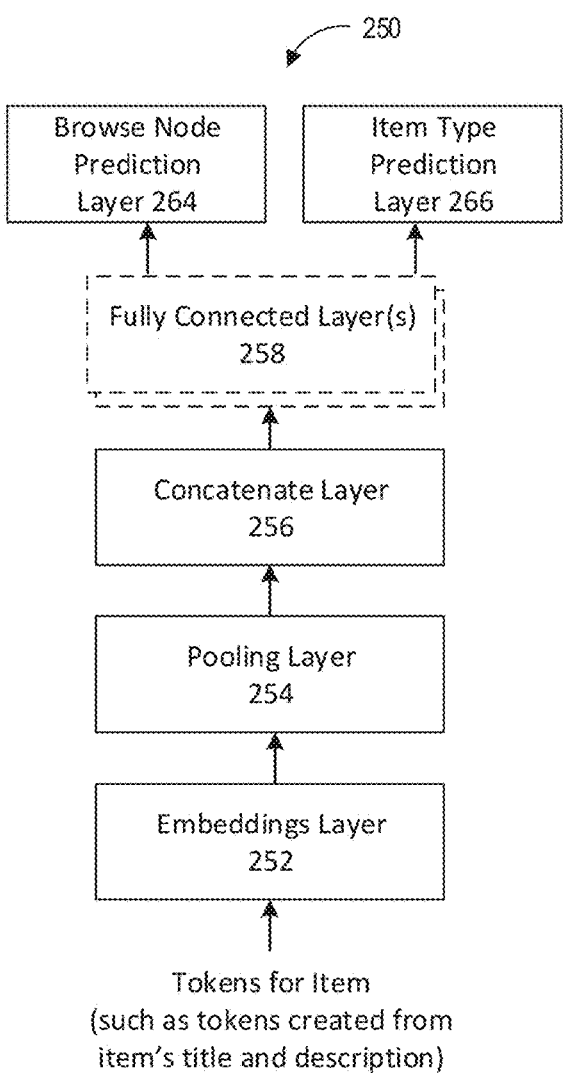
FIG. 2A
FIG. 2B

ITEM TYPE DISCOVERY AND CLASSIFICATION USING MACHINE LEARNING

BACKGROUND

An online store may be interested in properly labeling an item in the store. For example, an individual may upload a new item listing for an online store and choose one or more labels, search terms, or item categories to associate with the new item. Items may appear to fit the characteristics or types of multiple categories or subcategories, such that it may be possible for similar items to be associated with multiple distinct labels, types, or categories. For example, in electronic catalogs having hierarchical browse nodes or item categories, subcategories of different higher-level categories may appear very similar to each other (such as by appearing to represent overlapping item types to users), leading to ambiguity between given categories or subcategories. Items that are not categorized or labelled according to users' expectations may lead to user frustration or suboptimal results when a user submits item search queries or browses items by item category or type. Because the number of existing items and categories in a given electronic catalog system may be extremely large and frequently changing, it would be prohibitively expensive in terms of labor, time, and cost to check if every single item is associated with an intuitive and unambiguous item category and/or other label.

BRIEF DESCRIPTION OF DRAWINGS

Embodiments of various inventive features will now be described with reference to the following drawings. The drawings are provided to illustrate example embodiments described herein and are not intended to limit the scope of the disclosure.

FIG. 2A depicts various layers of a browse node classifier, according to one embodiment.

FIG. 2B depicts various layers of a hybrid browse node and item type classifier, according to one embodiment.

DETAILED DESCRIPTION

Figure 1:
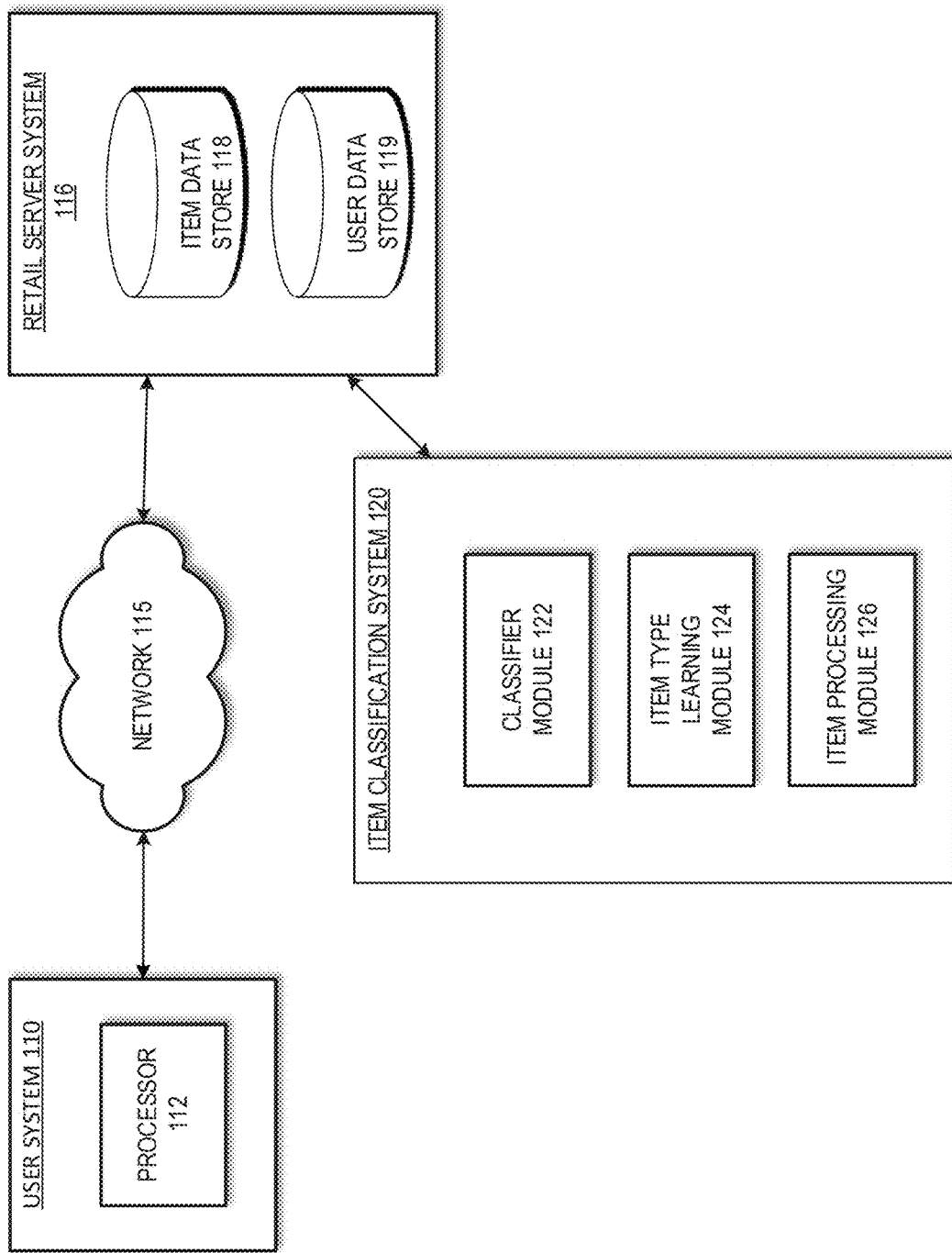
FIG. 1 depicts an illustrative networked environment and system architecture of an item classification system, according to some embodiments.

Generally described, aspects of the present disclosure relate to learning item types of items listed in an electronic repository, and training a machine learning model to predict the item type of a given input item. This item type information may then be used to provide improved search results and browsing experience for users. For example, in some embodiments that will be described herein, a machine learning model may be obtained or accessed that has been previously trained to classify an input item to a browse node or item category. Vector representations of individual items assigned to different browse nodes may be obtained from an intermediate layer of the previously trained machine learning model, and a vector representation of each browse node may then be generated based on the vector representations of individual items assigned to that browse node. A clustering algorithm may be applied to the browse node vector representations in order to identify clusters of similar browse nodes, where individual clusters may represent different unique item types. In some embodiments, a new machine learning model may then be trained to predict an item type for a new input item. In other embodiments, a new classification layer configured to output a predicted item type for the new input item may be implemented that relies on output of a penultimate layer in the earlier trained machine learning model. For example, this may lead to generation of a hybrid classifier that predicts both a browse node and an item type for a given input item.

In some embodiments, an electronic catalog of an online store or other service may be organized into a hierarchical browse taxonomy, where items are each assigned to a browse node, and browse nodes may be organized in a hierarchy of sub-nodes representing progressively narrower item categories. For example, in an electronic catalog that places items in a hierarchical order, a given women's leggings item may be placed under a browse node "Women's Clothing" which itself may be placed under the broad category of "Clothing," such as in a tree structure. Thus, a given browse node that is neither the root node nor a leaf node in the tree structure may have a parent browse node, as well as one or more children browse nodes.

In some instances, items that users may consider to be of the same item type or relate to the same item concept may be assigned to different browse nodes than one another, leading to browse node ambiguity and user confusion. For example, in one example existing system, there may be many different browse nodes that represent some variation of the item type or item concept "Knife," despite the system not necessarily storing information labelling individual items as being of the generalized "Knife" item type or labelling the various browse nodes as each containing items of the generalized "Knife" item type. For example, a first set of items that users would consider some form of knife may be assigned to browse nodes such as a "Chef's Knives" browse node, while another set of items may be assigned to a "Sashimi Knives" browse node, and still other items may be assigned to a "Camping Fixed-Blade Knives" browse node. At least some of these browse nodes may not even share a common parent node or other node higher up in the taxonomy. To improve various aspects of the user experience, as will be further discussed herein, it is desirable to provide automated methods of learning the various unique item types or item concepts present in an electronic catalog, and to assign item type labels to individual items apart from those items' item category or browse node assignment.

A number of advantages are provided according to aspects of the present disclosure relative to existing systems and alternative implementations. For example, aspects of the present disclosure, according to some embodiments, utilize language-agnostic deep text representation learning that outperforms existing solutions for many text classification and clustering tasks. Furthermore, methods described herein that are based on supervised word embedding training and vector averaging provides for significantly reduced computational cost for both training and inference when compared to more complex architectures, such as classical convolutional neural networks (CNNs), long short-term memory (LSTM) or other recurrent neural networks (RNNs), or Bidirectional Encoder Representations from Transformers (BERT). Additionally, techniques described herein that do not rely on pre-trained language models provide improved performance for non-standard vocabulary in item descriptions and mixed-language item descriptions.

As a further technical advantage, generation of a hybrid classifier described herein (such as to predict both browse node and item type for an input item) may improve classification results for the existing browse taxonomy, in addition to providing for the new item type classification described herein. For example, a hybrid network that solves the two classification problems simultaneously may achieve better results than a network that solves only one classification task. For example, a hybrid network may learn to generate better internal representations of an item because labels from the item type classification task put additional constraints on the parameters (relative to only predicting a browse node) and thus provide for regularization.

FIG. 1 depicts an illustrative networked environment and system architecture of an item classification system 120, according to some embodiments. The illustrative environment includes a user system 110, a network 115, an item classification system 120, and a retail server system 116. The user system 110 may be a computer, handheld mobile computing device, or other computing system. In some embodiments, a number of computing systems may each be used by a number of different users to submit user search queries to retail server system 116, browse items available via the retail server system 116, and/or add new items to be offered via the retail server system 116. In some embodiments, the user system 110 may utilize processor 112 to generate a user interface and execute user inputs to interact with retail server system 116. For example, user search queries submitted from user system 110 may be transmitted remotely to retail server system 116 over network 115. In some embodiments, retail server system 116 may process user search queries and output search results in response to a user search query. In some embodiments, retail server system 116 may store a log of user search queries, navigation paths, clicks, and purchases in user data store 119.

In some embodiments, item data store 118 may store item information for various items of an electronic catalog, which may include browse node association information that associates individual items with browse nodes. Item information stored for a given item may include, for example, a title, various structured item attributes (such as size, weight, brand, and/or other attributes that may be specific to only some items, such as a page count of a book), a textual description (which may be in a narrative form as sentences and/or paragraphs), bullet point lists of text describing features of the item, and/or other information.

In some embodiments, item classification system 120 may be in communication with retail server system 116 to perform various features described herein with respect to item information and browse node information stored in item data store 118. For example, the classifier module 122 may train and implement one or more machine learning models configured to predict browse node classification and/or item type classification of an input item, as will be further described herein. The item type learning module 124 may discover or learn item types of various items identified in item data store 118, such as based at least in part by performing clustering of similar browse nodes, as will be further described herein. The item processing module 126 may, for example, be responsible for receiving item information, preparing it for processing by the classifier module 122, and/or for updating item information in the item data store 118 based on output of the classifier module 122 (such as to assign an item type designation to an item). It will be appreciated that the functionality provided by these modules may be combined into fewer modules in other embodiments, or additional modules may be employed.

It will be appreciated that item type discovery features and classifier training features described herein may be implemented in a number of different environments than the one illustrated in FIG. 1. For example, modules illustrated as part of item classification system 120 could instead be included within another computing system, such as retail server system 116, such that the retail server system 116 may perform methods described herein without any external item classification system. Similarly, modules illustrated as part of item classification system 120 could instead be included within a variety of servers, network-accessible services or other systems that provide functionality potentially unrelated to a retail environment (such as with respect to items other than products). In other embodiments, the item classification system 120 may locally store item data, such that the retail server system 116 is not needed in some embodiments other than that illustrated in FIG. 1.

FIG. 2A depicts various layers of a browse node classifier 200, according to one embodiment. The classifier 200 is generally configured to receive item information regarding an item as input, and to output a prediction or classification of the appropriate browse node for that item. The illustrated embodiment of a browse node classifier is highly efficient computationally relative to alternative model types (as mentioned above), such that it may be used to generate automatic classification for each of potentially hundreds of millions of items. In the illustrated example, the classifier 200 is a deep neural network with an embeddings layer, though other machine learning architectures may be employed in other embodiments. For example, in some embodiments deep neural network architectures may be implemented other than the specific example architectures shown in FIGS. 2A and 2B, and multi-layered machine learning models other than deep neural networks may alternatively be used in other embodiments. In some embodiments, the classifier 200 may be trained in a supervised manner, such as using labelled item information for items that have been previously assigned to browse nodes by taxonomists and/or been assigned to browse nodes based on automated analysis of user behavior (such as users' item browse and purchase behavior after submitting search queries).

In the illustrated embodiment, the input data to the first layer (the embeddings layer 202 in this embodiment), is a set of tokens created from stored information regarding a particular input item, such as a particular product listed in the item data store 118. These tokens may correspond to words appearing in item information for the item, such as the words appearing in item's title, description, and bullet points (or other item feature or attribute list). In other embodiments, fewer or additional sources may be used to generate tokens regarding the item to be provided as input to the classifier 200, such as tokens generated from user reviews of an item or answers regarding the item that were submitted in a discussion forum or "question and answer" (Q & A) service associated with the retail server system 116. The layers 202, 204, and 206 may collectively be used to generate a language agnostic text representation of the input item.

In some embodiments, the tokens provided as input to the model may be obtained from an item's item information (e.g., from the item title, description and/or feature list) using a simple, computationally efficient tokenizer that removes punctuation and then separates text by spaces to obtain a list of words (where each word is considered to be a token). For certain languages, such as Japanese, more involved tokenization methods known in the art may be employed. For a sentence or a paragraph of tokens, the embeddings layer 202 may be used to obtain the vector representation of the tokens, such as by using a lookup function. For example, the embeddings layer 202 may map a word index to corresponding vector representations, which may be learned simultaneously with the other network parameters of the classifier 200. The result of the embeddings layer may thus be a sequence of vectors. In some embodiments, separate sequences of vectors may be generated for each portion or field of the item information (such as for each of the title, the description, and the bullet point list).

Next, the pooling layer 204 may further build a text representation by averaging all the vectors in a sequence, such as using global average pooling. In the case where the analyzed item information has multiple fields (e.g. title, description and bullet points), the text representation may be separately generated for each field, and then concatenated at concatenate layer 206 (which may be optional in other embodiments). In the illustrated example classifier 200, the text representation layers (layers 202, 204 and 206) are followed by a series of one or more fully connected layers 208. In one embodiment, three fully connected layers may be included in the classifier 200, though a different number of layers may be used in other embodiments. The output of the last fully connected layer 208 (which may be considered an intermediate layer or the penultimate layer in this particular classifier 200) is then used by the browse node prediction output layer 214 to generate the browse node prediction based on the vector representation of the item from the last of the fully connected layers 208. The prediction may include an associated confidence level.

As previously mentioned, it will be appreciated that other machine learning architectures and algorithms than that shown in FIG. 2A may be employed for browse node classification in other embodiments. For example, ensemble methods may be used to combine several base models that contribute to the final vector representation(s) of an item that will be used to make a final browse node prediction. Using ensemble methods, for example, the vector representation of an item to be used for prediction may be the average of the vector representations generated for that item at the intermediate layers of multiple models.

FIG. 2B depicts various layers of a hybrid browse node and item type classifier 250, according to one embodiment. As illustrated, the hybrid classifier 250 in the given embodiment includes layers directly corresponding to each of those in browse node classifier 200 (in this case, an embeddings layer 252, a pooling layer 254, a concatenate layer 256, one or more fully connected layers 258, and browse node prediction layer 264), but adds an item type prediction layer 266. Generation of the item type prediction layer will be further described below, such as with respect to FIG. 3. The item type prediction layer 266 may be configured to classify the input item to a given item type or item concept based on the same vector representation (generated at the last of the one or more fully connected layers 258) that the browse node prediction layer 264 uses to classify the input item to a given browse node. In the illustrated hybrid classifier 250, the browse node prediction layer 264 and the item type prediction layer 266 may each provide confidence levels for their respective predictions or classification results. In other embodiments, a stand-alone item type classifier may be generated that does not include a browse node prediction layer. In other embodiments, additional or alternative output layers may be trained based on clustering browse nodes in other manners or to represent different levels of similarity, such as a third output layer trained to predict an item concept representing a higher or lower level of granularity than the item type predicted by the item type prediction layer 266.

Figure 3:
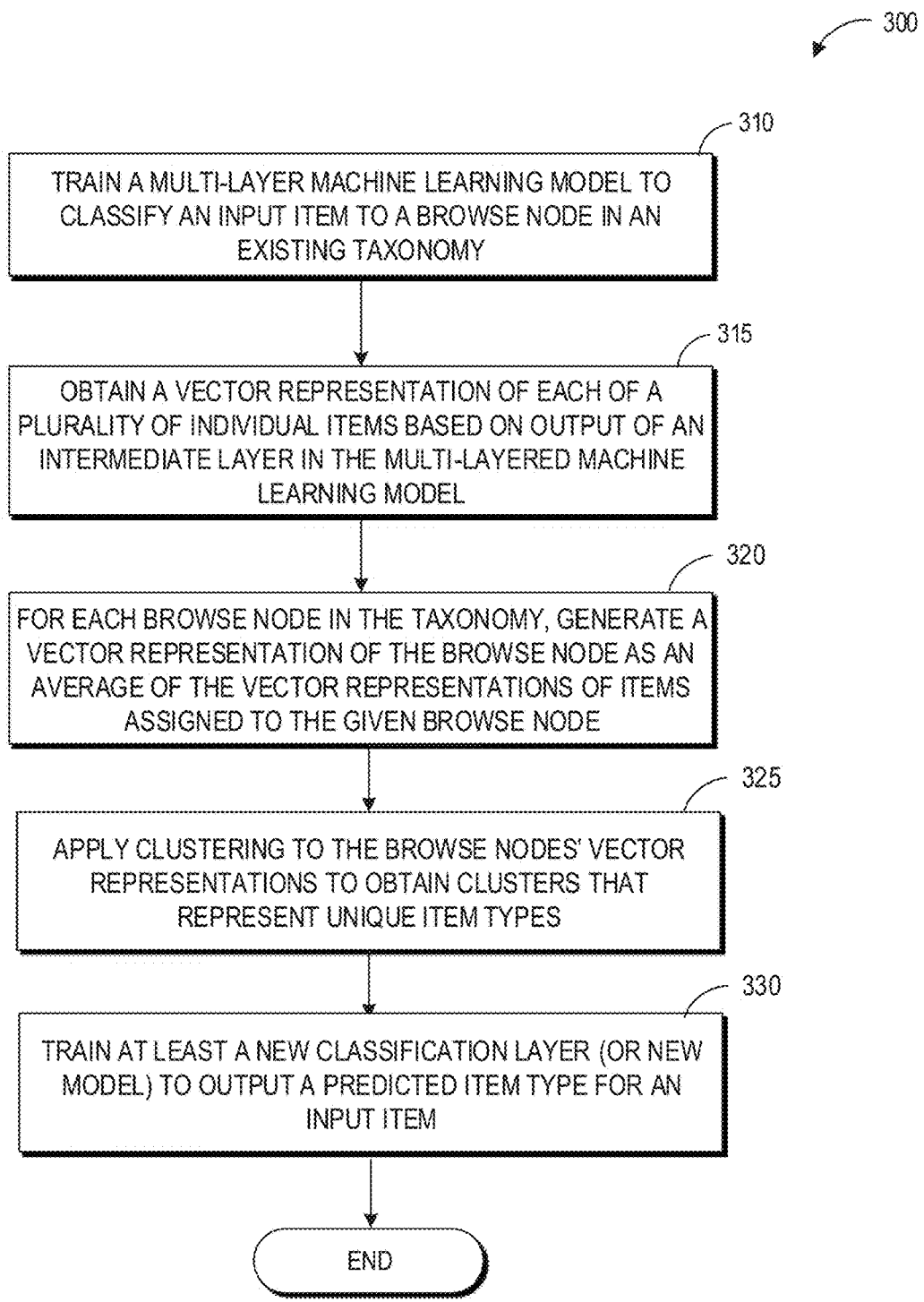
FIG. 3 is a flow diagram depicting an example method of discovering item types of items available in an online store or other repository, and training a machine learning model to predict an item type of an individual item, according to some embodiments.

FIG. 3 is a flow diagram depicting an example method 300 of discovering item types of items available in an online store or other repository, and training a machine learning model to predict an item type of an individual item, according to some embodiments. The illustrative method may be performed by the item classification system 120. As will be described below, this method 300 enables the item classification system 120 to discover item types based on knowledge extracted from item information in an electronic catalog or other item repository in an unsupervised manner, such that the initial item types are learned without any prior item type labelling by a human (though human validation steps may be employed subsequent to the initial unsupervised learning in a semi-supervised process).

The method 200 begins at block 310, where the item classification system 120 may train a multi-layer machine learning model (such as a deep neural network) to classify an input item to a browse node in an existing taxonomy, or may simply obtain or access a model previously trained to classify an item to a browse node. An example of such a model or classifier is classifier 200 described above with respect to FIG. 2A. The training and architecture of such a sample classifier is described above, though other multi-layered models may be used in other embodiments. While this initial browse node classifier may have been trained in a supervised manner, it may not have been trained with respect to any item type labels (in other words, the labeled training data may have indicated browse nodes to which items had been assigned, but no item type labels may have been included in the training data or otherwise be accessible to the item classification system at block 310 or previously).

Next, at block 315, the item classification system 120 may obtain a vector representation of each of a plurality of individual items based on output of an intermediate layer in the multi-layered machine learning model. With respect to the sample classifier 200 discussed above with respect to FIG. 2A, the vector representation may be obtained from the last fully connected layer 208. More generally, the vector representation may be obtained from the penultimate layer in the classifier, based on which the output layer (such as browse node prediction layer) generates its classification results. At block 315, this vector representation may be obtained for each item in a particular subset of browse nodes currently being analyzed for item type discovery. For example, the subset of nodes may be sub-nodes of a particular high-level node (such as Clothing) in order to make the process of discovering item types across the entire electronic catalog more manageable for large catalogs (such as those with millions of items). Alternatively, all items available in a given store or given geographic region may be processed and their vector representations obtained at block 315.

Each vector representation of an item may generally be a vector of numbers that reflects information regarding item and browse node relationships as a result of the classifier's training process (originally trained to predict a browse node for an input item). Using this vector representation for each item in subsequent steps below provides better results in discovering similar browse nodes than an alternative approach of simply using the word embeddings for the item's description.

At block 320, the item classification system 120 may, for each browse node in the taxonomy (or the subset of the taxonomy currently being analyzed), generate a vector representation of the browse node based on the vector representations of individual items assigned to that browse node. In some embodiments, a browse node's vector representation may be generated as an average of the vector representations of items assigned to the given browse node. In some embodiments, a weighted average or non-linear mappings may be employed by the item classification system in generating the browse node's vector representation based on the vector representations of the node's individual items. The result of block 320 may thus be a set of vector representations, where each vector representation in the set represents a different browse node.

At block 325, the item classification system 120 may apply clustering to the browse nodes' vector representations to obtain clusters that represent unique item types. For example, the item classification system may apply a clustering algorithm, such as spectral clustering in one embodiment, in order to identify distinct clusters of browse nodes (where browse nodes within a given cluster have similar vector representations to each other).

In some embodiments, the clusters identified in an unsupervised manner may then be evaluated by a human expert (such as an ontology specialist). For example, an ontologist may evaluate the clusters proposed by the clustering algorithm (which may be considered to represent candidate item types) to identify clusters that represent distinct item types. A supervised or semi-supervised approach may then be used to assign additional browse nodes to the identified item type clusters in embodiments in which the entire set of browse nodes have not yet been analyzed.

At block 330, the item classification system 120 may train at least a new classification layer (or new model) to output a predicted item type for an input item. For example, in one embodiment, an item type prediction layer may be added to the existing browse node classifier that was obtained at block 310 and the resulting model trained based on the item type labels determined from the clustering described above. In some such embodiments, prior layers of the existing browse node classifier may additionally be retrained as part of adding the new prediction layer. For example, in one embodiment, the prior fully connected layers and both the new and old prediction layers (such as the prior browse node prediction layer and the new item type prediction layer) may be trained based on the newly labelled data, while one or more initial layers (such as one or more embeddings layers) may be kept frozen. Alternatively, a new deep neural network or other machine learning model may be trained to predict the item type of an input item using similar labeled training data generated from the cluster determinations (e.g., items may be labelled to be a given item type in the training data based on the item type determined for the item's browse node). The result of block 330 in one embodiment may be a trained hybrid classifier such as classifier 250 described above with respect to FIG. 2B. Alternatively, the result of block 330 in other embodiments may be a classifier configured to predict only an item type.

Once a model has been trained to predict an item type for an item, an item type determination may be made in some instances with higher confidence than a browse node prediction for the same item. For example, a hybrid classifier may have greater confidence in an item's item type prediction than in its browse node prediction when two or more browse nodes are ambiguous and contain similar items. In some embodiments, the item classification system 120 may thus classify items in the item data store 118 as being of a certain item type in order to provide improved search and browse capabilities to users who are interested in certain item types that were previously spread out among multiple browse nodes in a manner that may not be intuitive to a user.

Figure 4:
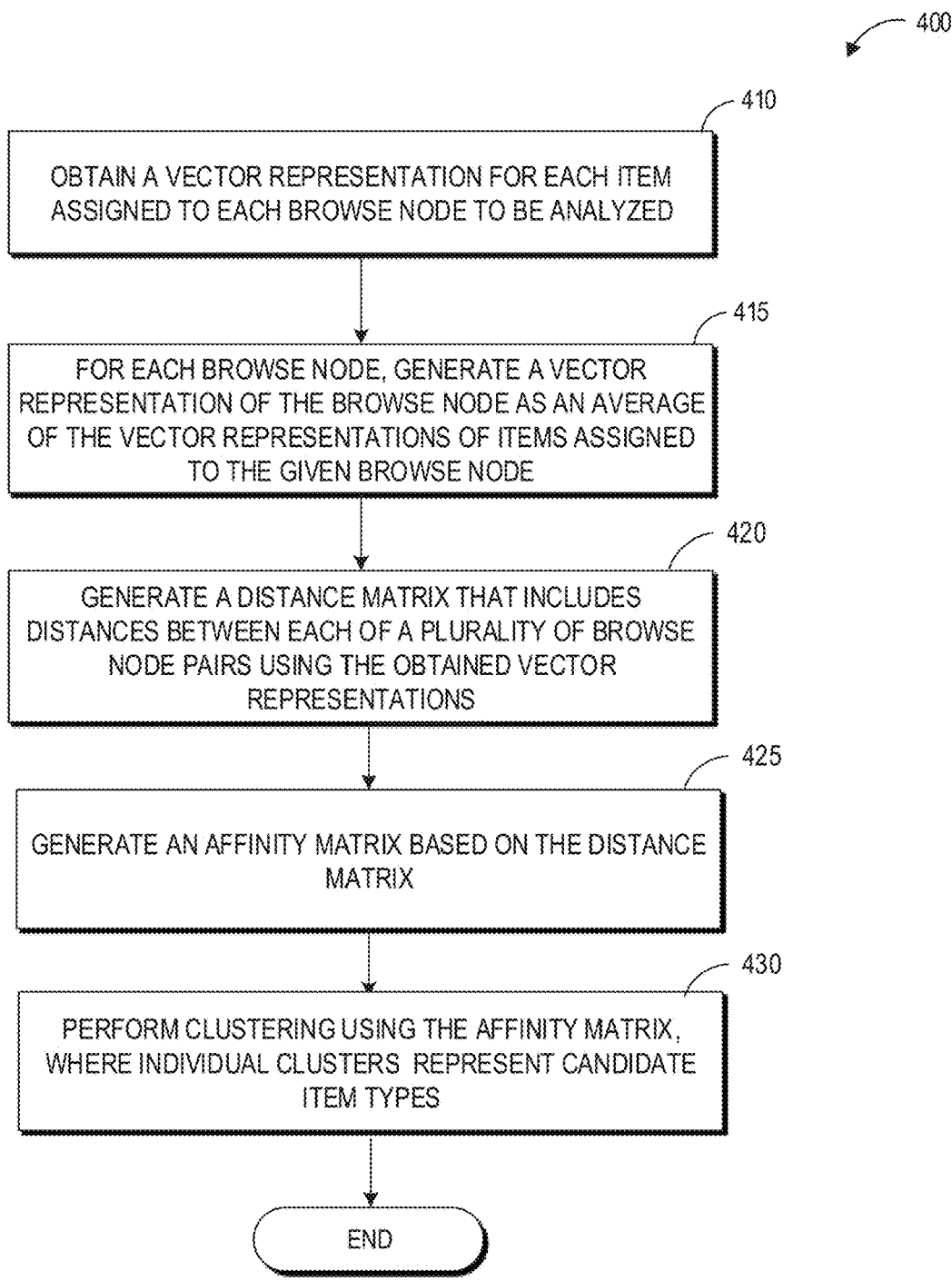
FIG. 4 is a flow diagram depicting an example method of identifying candidate item types based on analysis of items assigned to various browse nodes, according to some embodiments.

FIG. 4 is a flow diagram depicting an example method 400 of identifying candidate item types based on analysis of items assigned to various browse nodes, according to some embodiments. The method 400 may be implemented as a part of method 300 described above, in some embodiments, and provides additional detail regarding clustering techniques that may be employed. While specific clustering techniques are illustrated and discussed below with respect to FIG. 4, it will be appreciated that other clustering techniques may be used in other embodiments. For example, the clustering applied with respect to block 325 above could be performed in manners other than those described below with respect to FIG. 4. The method 400 may generally receive as input the number of target clusters and a set of browse nodes that have items assigned to those browse nodes.

At block 410, the item classification system 120 may obtain a vector representation for each item assigned to each browse node to be analyzed. As discussed above, this vector representation may be obtained from the last fully connected layer in the browse node classifier, in some embodiments. At block 415, the item classification system 120 may then, for each browse node being analyzed, generate a vector representation of the browse node as an average of the vector representations of items assigned to the given browse node, as previously discussed.

At block 420, the item classification system 120 may generate a distance matrix that includes distances between each of a plurality of browse node pairs using the obtained vector representations. For example, the Euclidian distance between each node pair's vector representations may be determined and placed in a matrix. The result of this block may thus be a matrix of size N×N, where N is the number of browse nodes being analyzed. At block 425, the item classification system 120 may then generate an affinity matrix based on this distance matrix. In one embodiment, the affinity matrix may be generated by applying a Gaussian kernel to the distance matrix. Lastly, at block 430, the item classification system 120 may perform clustering using the affinity matrix (such as using spectral clustering techniques), where individual clusters represent candidate item types that may then be further evaluated as discussed above.

Figure 5:
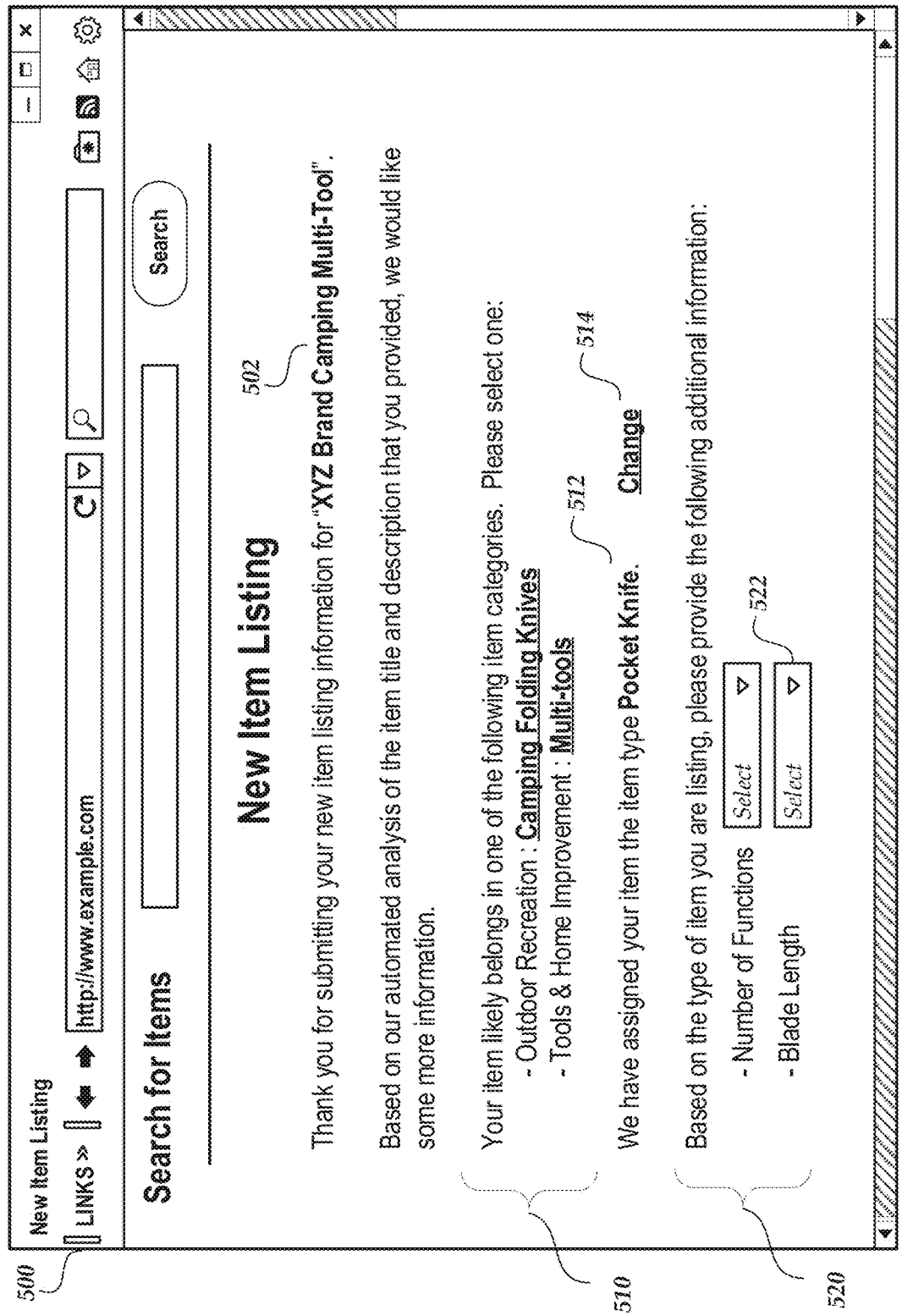
FIG. 5 is an illustrative user interface that presents to a seller various information and options when the seller requests to list an item for sale, where the information and options may be automatically determined based at least in part by providing, to a trained machine learning model, an initial title and/or textual description of the item that was provided by the seller.

FIG. 5 is an illustrative user interface 500 that presents to a seller various information and options when the seller requests to list an item for sale, where the information and options may be automatically determined by the item classification system 120 based at least in part by providing, to a trained machine learning model, an initial title and/or textual description of the item that was provided by the seller. In some embodiments, the user interface 500 may be generated at least in part by the item classification system 120 and/or retail server system 116 and sent to the user system 110 for display, such as for display via execution of a browser or other application operating on the user system 110.

User interface 500 may be presented after a user has provided initial information about an item that the user would like to list for sale via the retail server system 116, in one example. This information may have included user-submitted item title 502 (reading "XYZ Brand Camping Multi-Tool"), as well as text descriptions of the item in bullet-point and/or narrative form text. The item classification system 120 may have then provided this input text to a machine learning model (previously trained according to methods discussed above) that predicted an item type and browse node for the item. Based on the machine learning model's predictions, the user interface 500 has been generated to include browse node prediction information 510, item type indication 512, and an additional information request 520 based on the item type prediction.

As illustrated, the browse node prediction information 510 predicts that the item 502 should be classified in either the "Camping Folding Knives" browse node (which is indicated to be a child or sub-node of the "Outdoor Recreation" browse node) or the "Multi-tools" browse node (which is indicated to be a child or sub-node of the "Tools & Home Improvement" browse node). Two browse nodes may be indicated in this example in part because of ambiguity between the displayed browse nodes, which may have resulted in the machine learning model assigning similar confidence levels to both of these two browse nodes for the given item. In other instances, the machine learning model may predict a single browse node with sufficient confidence, such that an item is automatically assigned to the browse node or such that just a single browse node is presented for user approval.

The user interface includes an indication that the machine learning model has assigned the item 502 to the "Pocket Knife" browse node or category 512, which the user may request to change by selecting option 514. Based on the machine learning model predicting that the item 502 is of the item type "Pocket Knife" (indicated by item type indication 512), the user interface 500 has been generated to include the additional information request 520, which requests that the user indicate additional item attributes or features of the item—the number of functions of the multi-tool and its blade length. The item classification system 120 and/or retail server system 116 may have prompted the user for this information based on a determination that users shopping for this item type are interested in this information or find it particularly relevant when selecting between items. The user may select drop-down menu 522 in the illustrated example user interface 500 in order to be presented with options of common blade lengths for this item type. Once the user makes selections in user interface 500, the item may either be automatically added to the item data store 118 for browsing and purchase by other users, or may be placed in a queue for additional automated or manual review, depending on the embodiment.

Although an electronic or online store may be configured to facilitate the purchase of goods on a website using text-based search queries and user interfaces, it will be appreciated that other possibilities exist in other embodiments. For example, in some embodiments, an online or electronic store may be a collection of network-accessible services executed on computer hardware that provides multiple channels through which customers can access electronic catalogs stored in databases to find various available products and services. For example, an online store may be accessible via a mobile application on a handheld user computing device and may allow voice-based search queries to discover products or services relevant to a received audio query from a user computing device or smart speaker, such as a voice-based query to find items of a given item type that is of interest to a user.

Figure 6:
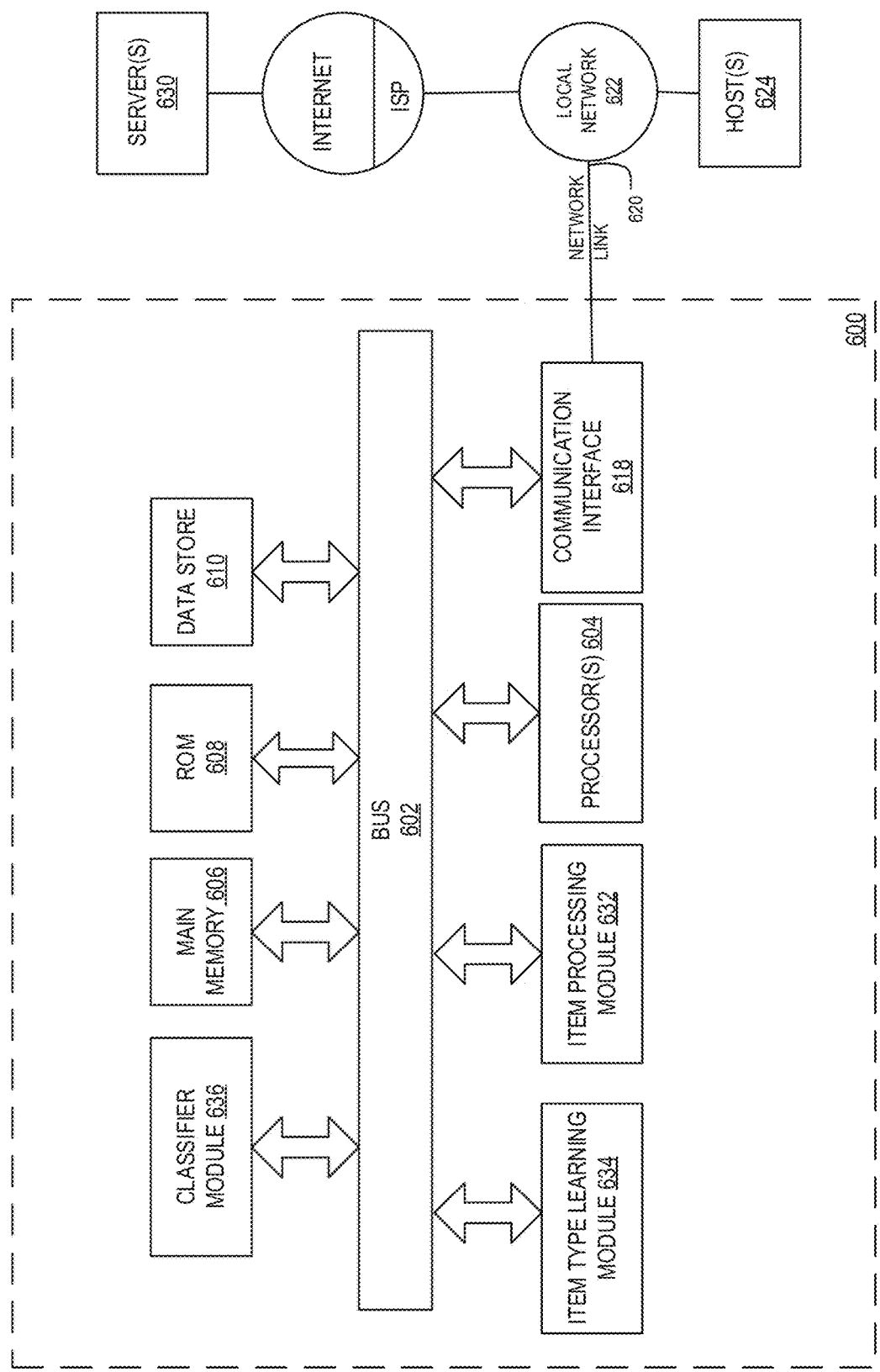
FIG. 6 is a block diagram depicting an illustrative architecture for a computing system that may implement one or more of the features described herein.

FIG. 6 is a block diagram depicting an illustrative architecture for a computing system 600 that may implement one or more of the features described herein. The computing system 600 may be configured to perform all or some of the features of the item classification system 120 discussed above. The computing system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

The computing system 600 also includes a main memory 606, such as a random access memory (RAM), cache, or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render the computing system 600 into a special-purpose machine that is customized to perform the operations specified in the instructions.

The computing system 600 further includes a read only memory (ROM) 608 or other static storage device coupled to bus 602 for storing static information and instructions for processor 604. Storage device 610, such as a magnetic disk, optical disk, Flash drives and/or other form of data storage, is provided and coupled to bus 602 for storing information and instructions.

The computing system 600 may further implement techniques described herein using customized hard-wired logic, one or more application specific integrated circuits (ASICs) or field programmable gate arrays (FPGAs), firmware and/or program logic which in combination with the computer system causes or programs the computing system 600 to be a special-purpose machine. According to one embodiment, the techniques herein may be performed by the computing system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

As part of a special-purpose machine, the computing system 600 may include classifier module 636, item type learning module 634, and item processing module 632. According to some embodiments, these modules may be configured to perform methods described above, such as those described above with respect to the corresponding named modules of FIG. 1. According to one embodiment, instructions may be transmitted through communication interface 618 to one or more servers 630. The instructions transmitted may be stored in ROM 608 in one embodiment.

Various forms of computer readable storage media may be involved in carrying one or more sequences of one or more computer readable program instructions to processor 604 for execution. For example, the instructions may initially be stored on a magnetic disk or solid state drive of a remote computer. The bus 602 may carry data to main memory 606, from which processor 604 retrieves and executes the instructions.

The computing system 600 also includes a communication interface 618 coupled to bus 602. Communication interface 618 provides a two-way data communication coupling to a network link 620 that may be connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the Internet 628 to a server 630 and/or user systems (not illustrated).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
a non-transitory data store that stores item information for individual items of a plurality of items, wherein the individual items of the plurality of items are assigned to at least one browse node of a plurality of browse nodes;
at least one physical computing device configured with computer-executable instructions that, when executed, cause the at least one computing device to:
obtain a deep neural network classifier trained to classify an input item to a browse node of the plurality of browse nodes, wherein the deep neural network classifier comprises at least (a) a first layer configured to generate a token-based text representation of the input item based on at least one of a textual description or a title of the input item, (b) an intermediate layer configured to generate a vector representation of the input item, and (c) a classification layer configured to output a predicted browse node for the input item;
for individual items in at least a subset of the plurality of browse nodes identified in the non-transitory data store, obtain a vector representation of the individual item from the deep neural network classifier, wherein the vector representation of the individual item is obtained from the intermediate layer of the deep neural network classifier after providing individual item information of the individual item as input to the first layer of the deep neural network classifier;

for individual browse nodes of the subset of the plurality of browse nodes, generate a vector representation of the individual browse node, wherein the vector representation of the individual browse node is generated based at least in part by determining an average of vector representations of items assigned to the individual browse node;

discover a plurality of item types represented among the plurality of items, wherein the item types are discovered based at least in part by applying clustering to the vector representations of the browse nodes, wherein individual clusters identified in the clustering represent different item types; and train at least one of (a) a second deep neural network classifier to predict an item type for a new input item or (b) a new classification layer configured to output a predicted item type for the new input item based on output of the intermediate layer of the first deep neural network classifier.

2. The system of claim 1, wherein the at least one computing device being configured to train the at least one of the second deep neural network classifier or the new classification layer results in a hybrid classifier configured to predict both an item type and a browse node for the new input item.

3. The system of claim 1, wherein a first item type of the plurality of item types represents a concept that describes both a first set of items assigned to a first browse node and a second set of items assigned to a second browse node, wherein the first browse node and the second browse node do not share a common parent node in a hierarchical browse node structure.

4. The system of claim 1, wherein to discover the plurality of item types represented among the plurality of items, the at least one computing device is further configured to:

obtain the vector representations for the individual browse nodes in the subset of the plurality of browse nodes;

determine a distance between individual pairs of a plurality of browse node pairs using the obtained vector representations;

generate a distance matrix based on the determined distances for the plurality of browse node pairs;

generate an affinity matrix based on the distance matrix; and perform spectral clustering using the affinity matrix, wherein clusters resulting from the spectral clustering represent candidate item types.

5. A system comprising:

a non-transitory data store that stores item information for individual items of a plurality of items, wherein individual items of the plurality of items are assigned to at least one browse node of a plurality of browse nodes;

at least one physical computing device configured with computer-executable instructions that, when executed, cause the at least one computing device to:

obtain a multi-layered machine learning model trained to classify an input item to a browse node of the plurality of browse nodes, wherein the multi-layered machine learning model comprises at least (a) one or more initial layers configured to generate a text representation of the input item, (b) an intermediate layer configured to generate a vector representation of the input item, and (c) a classification layer configured to output a predicted browse node for the input item;

for individual items in at least a subset of the plurality of browse nodes identified in the non-transitory data store, obtain a vector representation of the individual item from the multi-layered machine learning model, wherein the vector representation of the individual item is obtained from the intermediate layer of the multi-layered machine learning model after providing individual item information of the individual item as input to the multi-layered machine learning model;

for individual browse nodes of the subset of the plurality of browse nodes, generate a vector representation of the individual browse node, wherein the vector representation of the individual browse node is generated based at least in part by determining an average of vector representations of items assigned to the individual browse node;

discover a plurality of item types represented among the plurality of items, wherein the item types are discovered based at least in part by applying clustering to the vector representations of the browse nodes, wherein individual clusters identified in the clustering represent different item types; and train at least one of (a) a second multi-layered machine learning model to predict an item type for a new input item or (b) a new classification layer configured to output a predicted item type for the new input item based on output of the intermediate layer of the first multi-layered machine learning model.

6. The system of claim 5, wherein the intermediate layer configured to generate the vector representation of the input item is a fully connected layer, wherein the multi-layered machine learning model includes at least one additional fully connected layer between the one or more initial layers and the intermediate layer.

7. The system of claim 5, wherein the multi-layered machine learning model includes a plurality of layers that collectively result in generation of the text representation of the input item, wherein the plurality of layers includes an embeddings layer, a pooling layer and a concatenate layer.

8. The system of claim 5, wherein the multi-layered machine learning model is language agnostic with respect to textual descriptions of items provided as input to the multi-layered machine learning model.

9. The system of claim 5, wherein the at least one of the second multi-layered machine learning model or the new classification layer is trained without using any human-provided item type labels.

10. The system of claim 5, wherein the one or more initial layers configured to generate the text representation of the input item do not include a convolutional layer, wherein execution of the one or more initial layers with respect to input text of a first item is computationally more efficient than applying convolutional operations with respect to the input text of the first item.

11. The system of claim 5, wherein the at least one computing device being configured to train the at least one of the second multi-layered machine learning model or the new classification layer results in a hybrid classifier configured to predict both an item type and a browse node for the new input item.

12. The system of claim 11, wherein the hybrid classifier is configured to determine a first confidence level for a browse node prediction and a second confidence level for an item type prediction.

13. A computer-implemented method comprising:
obtaining a multi-layered machine learning model trained to classify an input item to a browse node, wherein the browse node is selected from a plurality of browse nodes, wherein the multi-layered machine learning model comprises at least (a) one or more initial layers configured to generate a text representation of the input item, (b) an intermediate layer configured to generate a vector representation of the input item, and (c) a classification layer configured to output a predicted browse node for the input item;
for individual items in at least a subset of the plurality of browse nodes, obtaining a vector representation of the individual item from the multi-layered machine learning model, wherein the vector representation of the individual item is obtained from the intermediate layer of the multi-layered machine learning model after providing individual item information of the individual item as input to the multi-layered machine learning model;
for individual browse nodes of the subset of the plurality of browse nodes, generating a vector representation of the individual browse node, wherein the vector representation of the individual browse node is generated based at least in part on vector representations of items assigned to the individual browse node;
determining a plurality of item types represented among the plurality of browse nodes, wherein the item types are determined based at least in part by applying clustering to the vector representations of the browse nodes, wherein individual clusters identified in the clustering represent different item types; and
training at least one of (a) a second multi-layered machine learning model to predict an item type for a new input item or (b) a new classification layer configured to output a predicted item type for the new input item based on output of the intermediate layer of the first multi-layered machine learning model.

14. The computer-implemented method of claim 13 further comprising:
determining an item type of individual items of the plurality of items based at least in part on use of at least one of the second multi-layered machine learning model or the new classification layer; and
storing an item type association in a non-transitory data store for individual items of the plurality of items based on the determined item types.

15. The computer-implemented method of claim 14 further comprising determining items relevant to a user-submitted search query based at least in part on the item type associations in the non-transitory data store.

16. The computer-implemented method of claim 13, wherein the text representation of the input item is generated based at least in part by:
generating tokens from a text description of the item to obtain a series of word-based tokens;
for individual portions of the text description, wherein an individual portion comprises a sentence or paragraph:
obtaining a vector representation for individual word-based tokens in the individual portion using embedding data, and
averaging the obtained vector representations for the individual portion.

17. The computer-implemented method of claim 13 further comprising:
receiving a text description of a first item submitted by a user to be added to an electronic catalog;
predicting a first item type of the first item based at least in part by providing the text description as input to the second multi-layered machine learning model; and
generating a user interface that suggests to the user that the first item be associated with the first item type in the electronic catalog.

18. The computer-implemented method of claim 17, wherein the user interface further includes information prompting the user to provide additional item information typically associated with items of the first item type.

19. The computer-implemented method of claim 13, wherein the multi-layered machine learning model is a deep neural network that includes an embedding layer.

20. The computer-implemented method of claim 13 further comprising training the second multi-layered machine learning model to predict the item type, wherein training the second multi-layered machine learning model comprises reusing an embeddings layer of the multi-layered machine learning model as a frozen layer and training at least one new intermediate layer and a new item type prediction layer.

* * * * *